ОR 3,608,999

United States

[11] 3,608,999

| [72] | Inventor | Alan C. Bailey<br>Big Flats, N.Y. |
|---|---|---|
| [21] | Appl. No. | 889,459 |
| [22] | Filed | Dec. 31, 1969 |
| [45] | Patented | Sept. 28, 1971 |
| [73] | Assignee | Corning Glass Works<br>Corning, N.Y. |

[54] MONITORING AND INDICATION SYSTEM UTILIZING FIBER OPTICS
5 Claims, 6 Drawing Figs.

[52] U.S. Cl. ................................................... 350/96 B,
240/8.4, 250/83.3 HP
[51] Int. Cl. ........................................................ G02b 5/14,
G02b 5/16
[50] Field of Search .......................................... 350/96 B;
240/8.4

[56] References Cited
UNITED STATES PATENTS
3,466,928  9/1969  Kind .............................. 350/96 B X
3,510,641  5/1970  Reynolds ........................ 240/8.4 X
3,519,742  7/1970  Bjelland ......................... 350/96 B UX
3,532,873  10/1970  Batson et al. .................. 350/96 B UX

*Primary Examiner*—David Schonberg
*Assistant Examiner*—Robert L. Sherman
*Attorneys*—Clarence R. Patty, Jr. and Charles W. Gregg ABSTRACT: A system for monitoring and giving indications of the deenergized and energized conditions of a light source which, when energized, emits rays including actinic rays. One end of a fiber optic bundle is disposed adjacent a reflective surface of a normally transparent device of a phototropic material or having phototropic properties and the other end of the bundle is disposed adjacent said light source. An indication symbol is disposed so as to be reflected by the reflective surface of the transparent device when no light is transmitted by the fiber optic bundle from the light source to the reflective surface. When light is so transmitted, the phototropic properties of the normally transparent device cause the device to be darkened so that the indication symbol is no longer visible or is no longer visible to any appreciable extent.

PATENTED SEP 28 1971    3,608,999
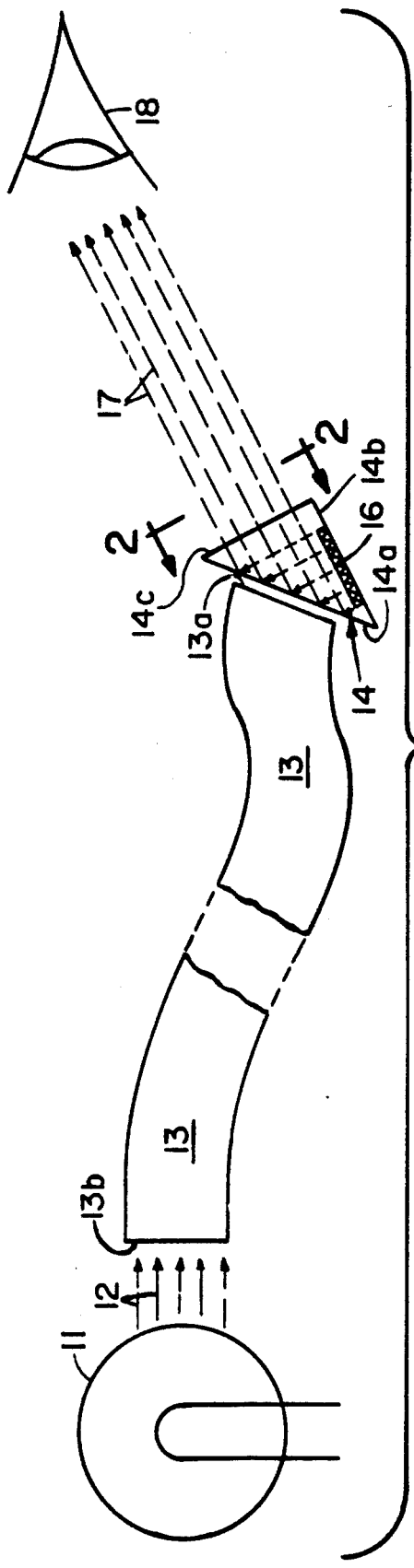
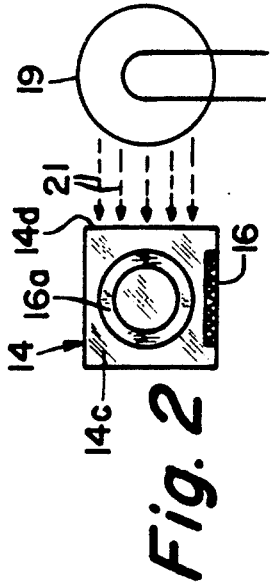
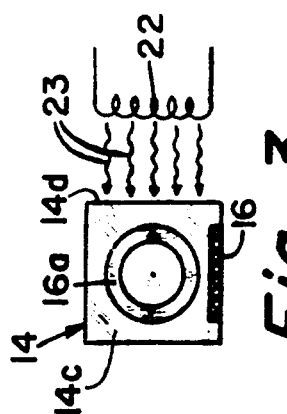
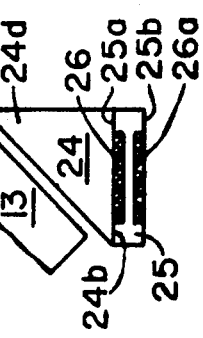
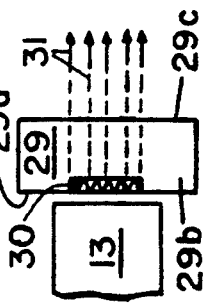
INVENTOR.
Alan C. Bailey
BY Charles W. Gregg
AGENT 3,608,999

MONITORING AND INDICATION SYSTEM UTILIZING FIBER OPTICS

BACKGROUND OF THE INVENTION

There are many instances or installations in which it is desired to know and/or indicate whether a lamp such as an electric lamp is energized or deenergized, that is, whether such a lamp is emitting visible light or not. In other words, it is oftentimes expedient to know whether an electrically energized lamp, such as a relatively high intensity incandescent lamp for example, is functioning properly or has failed due to lack of an intact filament, or broken electrical connections to such lamp so that the filament of the lamp is not energized and is not producing light. For an example, whether the lamp or lamps of an automobile headlight are operating is an extremely important consideration in night driving. While such lamp or lamps are substantially reliable for considerable lengths of time, because of such reliability, drivers are not in the habit of even periodically checking said lamp or lamps before or during periods of night driving. However, most reasonably careful or cautious drivers do pay attention to indication or so-called "telltale" lights provided on the panels of their dashboards.

For the purpose of providing indications of the functioning, for example, of the lamp or lamps of the headlights of an automobile, it has heretofore been known to provide so-called "light pipes" or fiber optic bundles having ends which receive light from the energized and operative lamp filaments and which transmit such light to a location on the dashboard of the automobile where the light, transmitted by said bundles to such location, is readily observable at the other ends of such bundles by the operator of the automobile and indicates to such operator functioning of the headlight lamps. However, it is well known that an indication, such as the energization of a lamp when a device such as the filament of an automobile headlight fails, is more readily noticeable than an indication of a misfunction of a device given by termination of a normally displayed indication such as, for example, the deenergization of a normally energized lamp upon the occurrence of a misfunction of a device. It is, accordingly, an object of the present invention to provide a system for monitoring, by the use of a fiber optic bundle, the proper operation or functioning of a light source such as an electric lamp and giving an indication, as by the display of an indication symbol, of any failure or misfunction of said light source.

BRIEF SUMMARY OF THE INVENTION

In accomplishing the aforesaid object of the invention there is provided a normally transparent device having phototropic characteristics or properties and a light reflective surface which is suitable for reflecting an indication symbol when no actinic radiation is transmitted to such device. A bundle of fiber optics is used to transmit light from a light source, such as an electric lamp, to said reflective surface and, in the absence of such light, such reflective surface causes said symbol to be displayed to a monitor or observer checking or monitoring the deenergized or energized conditions of said light source.

BRIEF DESCRIPTION OF THE DRAWINGS

In the drawings:

FIG. 1 is a schematic diagram on an enlarged scale of one form of a monitoring and indication system embodying the invention;

FIG. 2 is a schematic illustration or view of one means for aiding the natural fade rate of a phototropic device such as is employed in the system of FIG. 1, such view being taken generally along line 2—2 of FIG. 1;

FIG. 3 is a schematic illustration of another means for aiding the natural fade rate of the phototropic device such as is employed in the system of FIG. 1; such view also being taken generally along line 2—2 of FIG. 1; and FIGS. 4, 5 and 6 illustrate additional types of phototropic devices which may be used in the system of FIG. 1 in practicing the invention.

Similar reference characters refer to similar parts in each of the FIGS. of the drawings.

PREFERRED EMBODIMENTS OF THE INVENTION

Referring to the drawings in detail, there is shown in FIG. 1 a light source such as an incandescent lamp 11 which, when energized as by connection to a suitable electric source not shown, emits rays including actinic light rays. Such lamp may, for example, be the lamp of an automobile headlight as previously discussed but, as a further instance, can be any lamp having a relatively high luminous intensity or emitting suitable actuating wavelengths. The light rays from lamp 11 and indicated by the reference character 12 are transmitted to an end 13b of a bundle of fiber optics 13 which end of such bundle is disposed adjacent to light source or lamp 11. Fiber optic bundle 13 conveys the light rays impinging on or transmitted to end 13b of bundle 13 to another end 13a of such bundle from where they are transmitted to the reflective surface 14a of a normally transparent device of a phototropic material or having phototropic characteristics or properties, which device is shown in FIG. 1 as a prism 14. Fiber optic bundles such as 13 are now well known in the art and such bundle may, by way of an example only, comprise a flexible bundle of light conducting fibers or fiber optic such as the device 10 shown in FIG. 1 of U.S. Pat. No. 3,198,059, issued Aug. 3, 1965 to R. A. Phaneuf et al. However, if found desirable or expedient, fiber optic bundle 13 may be a rigid rather than a flexible bundle of fiber optics.

The transparent device 14 having phototropic properties or characteristics or formed of a phototropic material is preferably, but need not necessarily be, a reflection prism made of phototropic glass having a reflective surface 14a adjacent to which end 13a of bundle 13 is disposed as mentioned above and as shown in FIG. 1. Prism 14 may, for example, be formed from a phototropic glass such as one of those disclosed in U.S. Pat. No. 3,208,860, issued Sept. 28, 1965 to W. H. Armistead et al. and assigned to the same assignee as the present application.

It is expedient to point out at this point in the description that the terms "phototropic materials" or "materials having phototropic characteristics or properties" as employed herein are intended to refer to materials which have optic densities which vary reversibly with the amount of radiation such as actinic radiation incident thereon or to which articles formed of such materials are exposed. That is to say, as is now well known in the art, the optical densities or light absorption characteristics of devices formed of phototropic materials or of materials having phototropic characteristics or properties, as such terms are used herein, increase with exposure of such devices to radiation such as to a source of light which emits rays including actinic rays, and decrease or "fade" at a so-called "natural fade rate" when said exposure of said devices is terminated. It is also now well known in the art that the natural fade rate of phototropic materials or materials having phototropic characteristics can be aided by exposure of articles formed of such materials to a suitable source of rays such as a source of infrared heat rays or a source of visible light which includes waves having wavelengths at least near or approaching the higher end of the visible spectrum. This will be further discussed hereinafter in conjunction with FIGS. 2 and 3 of the drawings.

Referring further to FIG. 1 of the drawings, a suitable indication symbol 16 is disposed so as to be reflected from surface or face 14a of device or prism 14 to surface 14a of such prism. To obtain such reflection, symbol 16 may, for example, be inscribed on surface 14b of device 14 as by engraving or etching of such symbol on surface 14b or in the layers of material immediately underlying such surface. Since the system of the invention is illustrated in FIG. 1 as monitoring and indicating the functioning of a lamp such as 11, an indication given by the letter or symbol "O" is considered appropriate to indicate nonfunctioning or a misfunction of such lamp, that is, an indication indicating that lamp 11 is "OFF" when it should be emitting light.

Light rays having wavelengths approaching or near and/or at the higher end of the visible spectrum are transmitted from surface 14b of device 14 and symbol 16 on or in such surface to transmit an image of said symbol 16 onto reflective surface 14a of device 14 as illustrated in FIG. 1 and, as indicated by reference character 17, said light rays are further reflected from surface 14a through surface 14c of said device to transmit a reflection or reflected image of symbol 16 to monitoring and indication receiving means 18, shown in FIG. 1 as the human eye. However, as will be readily recognized by those skilled in the art, and if found desirable or expedient to do so, other types of monitoring and indication receiving means could be used, in the inventive system disclosed, in the place of the eye of a human observer or monitor indicated at 18.

It should be pointed out that, for the purpose of describing and claiming the inventive system disclosed herein, device 14 is considered to be and is referred to as being normally transparent, that is, is normally in condition to reflect an image of symbol 16 as discussed heretofore and as will be more apparent from the brief operational example of the invention which follows.

For the purpose of the aforesaid operational example, it will be assumed that light source or lamp 11 is in an energized condition, that is, is energized by connecting the filament of such lamp across a suitable source of electrical current as previously mentioned. Light rays from such filament are then transmitted to end 13b of fiber optic bundle 13 and through such bundle, in the manner now well known in the art, to end 13a of the bundle. Said light rays are further transmitted from said end 13a to impinge on reflective surface 14a of device 14. Such light rays stimulate the phototropic properties of device 14, that is, of the material from which device 14 is made, and reflective surface 14a, and regions of device 14 below such surface, darken, that is, increase in optical density or light absorption characteristics to interrupt or to at least substantially diminish the previously discussed reflection of indication symbol 16 to monitor 18. In other words, following the transmittance of light rays from light source or lamp 11 to surface 14a, such surface and regions of device 14 below such surface are caused, by the actinic radiation from said source, to absorb all or a substantial part of the light rays which were previously transmitting an image of symbol 16 to monitor 18. At such time monitor 18 monitors a darkened condition of surface 14c of device 14.

It will now be assumed that the filament of lamp 11 fails, one of the electrical connections to such lamp is interrupted as by the breaking of an electrical conductor or wire to revert the lamp to its deenergized condition, or some other failure occurs to cause nonfunctioning or misfunctioning of light source or lamp 11 so that it no longer emits light rays. Under such conditions light rays are, of course, no longer transmitted to surface 14a of device 14 and the reversible phototropic properties of the material of such device subsequently causes said surface 14a and the regions of device 14 therebeneath to lighten or fade at their natural fade rate and an image of indication symbol 16 to again be subsequently transmitted to monitor 18 to indicate that said lamp or light source is off, that is, has failed.

Referring now to FIG. 2 of the drawings, as previously mentioned the natural fade rate of device 14, that is, of the material of which such device is made, can be aided or accelerated by the use of a source of light, such as a lamp 19 shown in FIG. 2 and which emits light rays, indicated by the reference character 21, which include rays which are suitable for said fade rate aiding or acceleration such as a source of visible light including rays or waves having wavelengths approaching or near, and/or at the higher end of the visible spectrum. The rays from lamp 19 are, as illustrated in FIG. 2, transmitted to end face or surface 14d of the device such as prism 14 and thence into the interior regions of such device for the above-mentioned aiding purposes. When a system of the type herein disclosed is, as previously mentioned, used for monitoring and indicating the energized and deenergized conditions of the lamp of an automobile headlight during night driving, it is necessary to use a light source such as 19 in order to illuminate an indication symbol such as 16 and cause a visible image of such symbol to be projected or reflected, as indicated at 16a in FIG. 2, onto surface 14c of the device such as prism 14. In other installations or uses of a system in accordance with the present invention, suitably filtered incident light may, for example, be used for illumination of an indication symbol such as 16 to produce the desired reflection.

As previously mentioned, there is shown in FIG. 3 a heating device 22 which emits heat rays indicated by the reference character 23 and which impinge on face or surface 14d of device 14 and are transmitted to the interior of such device to aid or accelerate the previously discussed natural fade rate of the phototropic materials of which device 14 is made. In the use of a heating device such as 22 for increasing, that is, accelerating said fade rate, suitably filtered incident light may also be used, as previously mentioned in conjunction with FIG. 2 of the embodiment of the invention, for illumination of an indication symbol such as 16 to produce the desired reflection or image such as 16a of such symbol.

FIG. 4 of the drawings illustrates an embodiment of the invention in which an indication symbol to be transmitted, that is, in which such symbol is inscribed on a first surface 25a, the opposite surface 25b or, preferably, both such surfaces, of a relatively flat nonphototropic transparent panel or pane 25 one of whose surfaces, namely, surface 25a is juxtaposed against surface 24b of a phototropic device such as 24 which is similar to the device such as prism 14 previously discussed and which is shown in FIGS. 1, 2 and 3 of the drawings. Device 24 includes surfaces 24a, 24b, and 24c which, as will be readily recognized by those skilled in the art and by the previous description of device 14, correspond to surfaces 14a, 14b and 14c, respectively, of device 14. A monitoring and indication system incorporating device 24 and the transparent pane or panel 25 operates in a manner similar to that described in conjunction with FIG. 1 and no further description of the arrangement of FIG. 1 is considered necessary.

There is shown in FIG. 5 of the drawings another form of a transparent phototropic device 27, that is, a device formed of phototropic materials, or of materials having phototropic properties or characteristics and which may be used in the practice of the invention. Device 27 is illustrated in FIG. 5 as a panel or pane made by cutting off a section of a prism such as by cutting a device, such as prism 14 of FIG. 1, in a plane extending parallel with surface 14a of such device or prism, thereby providing an additional face or surface such as 27e shown in FIG. 5 on device 27. Only the configuration or shape of an end face or surface 27c of device 27 is illustrated in FIG. 5 but the overall shape of the panel or pane, that is, of device 27, will be readily apparent to those skilled in the art from a brief glance at FIG. 5 and the foregoing brief discussion of how such device is or may be made.

In the embodiment of FIG. 5, the indication symbol 28, an image of which is to be transmitted or reflected to a monitor such as 18 (FIG. 1) is provided on or in surface 27b of device 27, and the light rays conveying the image or reflection of said symbol are transmitted through a path such as generally illustrated in FIG. 5 by a single dashed line. Such light rays are indicated in FIG. 5 by the reference character 32 when they are emitted from face or surface 27c of device 27. Surfaces 27a, 27b, 27c and 27d of device 27 correspond to surfaces 14a, 14b, 14c and 14d, respectively, of the phototropic device such as 14 shown in FIGS. 1, 2 and 3 of the drawings, as is believed readily apparent. It is pointed out that the image such as 28 can be inscribed on or in one or both of opposite surfaces of a separate transparent and nonphototropic pane or panel rather than in or on surface 27b of panel or pane 27 and that such separate pane or panel can then be placed adjacent surface 27b of pane or panel 27 with one of said inscribed surfaces of the separate pane or panel juxtaposed against surface 27b of pane or panel 27. Such arrangement would, of course, be similar to that illustrated in FIG. 4 previously discussed.

A third type of phototropic device 29, that is, a device made of phototropic materials or of materials having phototropic properties and which may be used in practicing the invention is shown in FIG. 6. Device 29 comprises a block, pane or panel of a transparent phototropic material and an indication symbol such as 30 is inscribed in or on face or surface 29a of the device and such surface is then disposed adjacent end 13a of fiber optic bundle 13. In practicing the invention by using a device such as 29 an image of symbol 30 is transmitted through device 29 and out of face or surface 29c as illustrated in FIG. 6 by the light rays indicated by the reference character 31.

In modifications of the invention employing devices such as 27 and 29 shown in FIGS. 5 and 6 of the drawings, the operation is the same as that described in conjunction with FIG. 1 and no additional operational examples are believed necessary. It is also pointed out that a source of light rays such as 19 or a source of heat rays such as 22 and such as shown in FIGS. 2 and 3, respectively, of the drawings can also preferably be used in conjunction with any of the modifications of the invention such as have been discussed in relation to FIGS. 4, 5 and 6 of the drawings. That is, fade rate aiding rays can also be used in the modifications of FIGS. 4, 5 and 6 of the drawings in a similar manner and for the same purpose as discussed in conjunction with FIGS. 2 and 3. In such event, such rays may, for example, be caused to impinge upon or be transmitted to faces or surfaces 24d, 27d and 29d of devices 24, 27 and 29, respectively. This will be obvious to those skilled in the art.

I claim:

1. A system for monitoring a light source which, when energized, emits rays including actinic rays and for giving indications of the deenergized and energized conditions of said source; said system comprising;
   A. a normally transparent device made of a material having phototropic properties and including a light reflective surface,
   B. a bundle of fiber optics having one of its ends disposed adjacent said reflective surface of said transparent device for transmission of light rays thereto and its other end disposed adjacent said light source for receipt of light rays therefrom, and
   C. an indication symbol disposed to be reflected from said reflective surface of said transparent device to a monitor for checking said conditions of said source.

2. A system as in claim 1 and in which said transparent device is a glass prism.

3. A system as in claim 2 and further including a source of rays which are suitable for aiding the natural fade rate of the glass of said prism, such source being disposed so that such rays are transmitted through one of the polygonal faces of the prism into the interior thereof.

4. A system as in claim 3 and in which said source of fade rate aiding rays is a source of visible light including waves having wavelengths which will optically bleach said material having phototropic properties.

5. A system as in claim 3 and in which said source of fade rate aiding rays is a source of heat rays.